(12) United States Patent
Montoya

(10) Patent No.: US 11,238,471 B2
(45) Date of Patent: Feb. 1, 2022

(54) SYSTEM AND METHOD FOR PROVIDING INCENTIVE BASED DYNAMIC SURVEY INFORMATION

(71) Applicant: Patrick Montoya, Ann Arbor, MI (US)

(72) Inventor: Patrick Montoya, Ann Arbor, MI (US)

(*) Notice: Subject to any disclaimer, the term of this patent is extended or adjusted under 35 U.S.C. 154(b) by 3 days.

(21) Appl. No.: 16/890,343

(22) Filed: Jun. 2, 2020

(65) Prior Publication Data

US 2020/0294068 A1 Sep. 17, 2020

Related U.S. Application Data

(63) Continuation-in-part of application No. 15/258,101, filed on Sep. 7, 2016, now Pat. No. 10,891,635.

(60) Provisional application No. 62/856,093, filed on Jun. 2, 2019.

(51) Int. Cl.
| | |
|---|---|
| *G06Q 30/02* | (2012.01) |
| *G06Q 10/10* | (2012.01) |
| *G06F 16/9538* | (2019.01) |
| *G06F 40/279* | (2020.01) |
| *G06F 3/0484* | (2013.01) |

(52) U.S. Cl.
CPC ..... *G06Q 30/0203* (2013.01); *G06F 16/9538* (2019.01); *G06Q 10/10* (2013.01); *G06Q 30/0215* (2013.01); *G06Q 30/0217* (2013.01); *G06F 3/04842* (2013.01); *G06F 40/279* (2020.01)

(58) Field of Classification Search
CPC . G06Q 30/0203; G06Q 30/0217; G06Q 30/02
See application file for complete search history.

(56) References Cited

U.S. PATENT DOCUMENTS

| | | | |
|---|---|---|---|
| 6,502,745 B1* | 1/2003 | Stimson | G06Q 20/04 |
| | | | 235/375 |
| 8,275,648 B2* | 9/2012 | Carrier | G06Q 10/00 |
| | | | 705/7.32 |
| 9,305,059 B1* | 4/2016 | Glickman | G06F 16/2457 |
| 2002/0128898 A1* | 9/2002 | Smith, Jr. | G06Q 30/0203 |
| | | | 705/7.32 |

(Continued)

*Primary Examiner* — Johnna R Loftis

(74) *Attorney, Agent, or Firm* — Vivacqua Crane PLLC

(57) ABSTRACT

A method of dynamically creating and modifying an electronic survey includes providing a website having a database storing previously collected survey results; each of the surveys having survey questions and selectable answers; receiving respondent input, via a GUI, requesting a survey within the database, presenting, a survey matching the respondent input including the survey questions, the selectable survey questions having selectable answer options including question modification, answer provision and answer modification options; receiving a respondent response to the survey questions including one or more of: selecting the question modification option and providing a new or modified question, selecting the answer provision option and providing a selected answer, and selecting the answer modification option and providing a modified answer; uploading the respondent response to the database, and dynamically and automatically modifying the survey by appending the respondent response, and the dynamically altered survey is provided to subsequent users and respondents.

16 Claims, 5 Drawing Sheets

(56) References Cited

U.S. PATENT DOCUMENTS

| | | | | |
|---|---|---|---|---|
| 2002/0152092 | A1* | 10/2002 | Bibas | G06Q 50/167 |
| | | | | 705/316 |
| 2003/0232245 | A1* | 12/2003 | Turak | G09B 7/00 |
| | | | | 429/231.95 |
| 2006/0117388 | A1* | 6/2006 | Nelson | G06F 21/577 |
| | | | | 726/25 |
| 2008/0288276 | A1* | 11/2008 | Harris | G06Q 30/02 |
| | | | | 705/7.32 |
| 2011/0178857 | A1* | 7/2011 | DelVecchio | G06Q 30/02 |
| | | | | 705/14.19 |
| 2017/0032028 | A1* | 2/2017 | Joi | G06F 16/35 |
| 2017/0132313 | A1* | 5/2017 | Kukla | G06F 16/338 |

* cited by examiner

SYSTEM AND METHOD FOR PROVIDING INCENTIVE BASED DYNAMIC SURVEY INFORMATION

CROSS-REFERENCE TO RELATED APPLICATIONS

The present application is a Continuation-in-Part of U.S. patent application Ser. No. 15/258,101 filed on Sep. 7, 2016 which in turn claims priority to U.S. Provisional Patent Application No. 62/215,155 filed Sep. 7, 2015. The present application also claims the benefit of U.S. Provisional Application No. 62/856,093, filed Jun. 2, 2019. The entire contents of each of the above applications are incorporated herein by reference in their entirety.

TECHNICAL FIELD

The present specification generally relates to methods, processes, and systems for generating and providing an electronic survey and receiving response data and, more particularly, to electronic survey systems and methods that provide a dynamic survey that is modifiable by one or more respondents such that the response data accurately reflects the one or more respondents' opinions.

BACKGROUND

Market research, social science, and political science are technical fields that rely heavily on practical applications such as present art electronic (online) survey technology. However, the accuracy of the information obtained from surveys depends on the genuineness of responses to the questions in present art electronic surveys. Currently, electronic surveys that are provided to individuals do not allow users to genuinely respond to survey questions and accurately reflect the true user's response because the user is limited to particularly worded static questions and/or a certain number of static preset responses that may not accurately reflect the user's opinion.

Accordingly, a need exists for systems and methods that provide a fundamental technical improvement to the technique for conducting, and thereby to the accuracy of electronic surveys and enabling a user to seamlessly and dynamically modify a question and/or one of the preset responses to accurately reflect the user's opinion.

SUMMARY

According to several aspects, a method of dynamically creating and modifying an electronic survey via a graphical user interface on a website includes providing a website with hardware and software server components. The components include non-standard or specialized components that perform services for website users and respondents. The specialized components include one or more databases storing previously collected survey results. The method further includes establishing communication via the internet between a processing device and the one or more databases. Each of the one or more databases store one or more surveys. Each of the one or more surveys include first survey questions each of the first survey questions having selectable first answer options. The method further includes receiving, via the graphical user interface on the website, a respondent input requesting a first survey within the database. The graphical user interface includes input/output hardware in electronic communication with the processing device. A survey matching the respondent input including the first survey questions is presented, via the graphical user interface. Each of the selectable first survey questions has selectable first answer options including a question modification option, an answer provision option and an answer modification option. The method further includes receiving, via the graphical user interface, a respondent response to the first survey questions. The respondent response includes one or more of: selecting the question modification option and providing a new or modified question, selecting the answer provision option and providing a selected answer, and selecting the answer modification option and providing a modified answer. The method further includes uploading the respondent response to the first survey questions to the database via the processing device and through the internet. The first survey is dynamically modified by automatically appending the respondent response to the first survey questions, and the dynamically altered first survey is provided to subsequent users and respondents.

In another aspect of the present disclosure, receiving, via the graphical user interface, a respondent response further includes: receiving, by the processing device, an input corresponding to a new question and one or more corresponding new answer choices for the new question. The method further includes receiving, by the processing device, a respondent selection of one or more of the new answer choices. The method further includes selectively appending the respondent response to the first survey.

In yet another aspect of the present disclosure selectively appending the respondent response to the first survey further includes: receiving a modification of one or more of the selectable first answer options, including; and receiving an answer that more accurately reflects an opinion of the respondent than the selectable first answer options.

In still another aspect of the present disclosure selectively appending the respondent response to the first survey further includes: searching the database for previous responses to the question modification option, the answer provision option, and the answer modification option. When the respondent response matches an existing response from the previous responses to the question modification option, the answer provision option and the answer modification option, the processing device logs the respondent response in the database as an additional one of the existing responses to the question modification option, the answer provision option and the answer modification option. When the respondent response does not match an existing response from the previous responses to the question modification option the answer provision option and the answer modification option, the processing device logs the respondent response in the database as a second new response.

In yet another aspect of the present disclosure dynamically modifying the first survey further includes: statistically aggregating, by the processing device, the respondent responses to produce updated survey results in a batch process. Dynamically modifying the first survey further includes updating the first survey with the additional one of the existing responses and second new responses, and statistically aggregating the respondent responses to produce updated survey results in real time. Dynamically modifying the first survey further includes receiving, by the processing device, a request for updated survey results, and providing, via the graphical user interface on the website, updated survey results to website users and respondents. Dynamically modifying the first survey further includes providing the updated survey results by presenting updated first survey questions from user and respondent selected surveys in the order of one or more of: a quantity of existing responses to the first survey questions, a quantity of second new responses to the first survey questions, a quantity of responses to the answer provision option with matching answer selections.

In still another aspect of the present disclosure utilizing an incentive system stored as programmatic control logic in the storage medium in electronic communication with at least one of the one or more databases and the processing device, the incentive system incentivizing users to author new survey questions and provide survey answers. Users accumulate credits within the incentive system that are redeemable for value in the form of one or more of: cash, goods, and services, or a chance to win one or more of cash, goods, and services; the credits accumulating in proportion to a quantity of respondents who have responded to a question generated by an authoring user. Respondents accumulate credits within the incentive system for each of certain predetermined surveys or survey questions to which the respondent responds.

In yet another aspect of the present disclosure a method for dynamically creating and modifying an electronic survey includes prompting respondents to input a statement about particular subject matter. The method further includes analyzing the statement with survey question generating software, the statement being submitted via the graphical user interface. The survey question generates software stored as programmatic control logic in the storage medium in electronic communication with at least one of the one or more databases and the processing device. The statements include one or more of sentences, numerical information, and computer software code. The survey question generating software extracts new questions from the statement by performing one or more of: syntactic analysis, semantic analysis, and template-based analysis. The survey generating software then provides to respondents, the one or more new questions as first survey questions.

In still another aspect of the present disclosure the method for dynamically creating and modifying an electronic survey includes utilizing an embedded program to access the one or more databases. The embedded program receives the respondent input, presents via the graphical user interface, the survey matching the respondent input, and receives via the graphical user interface, the respondent response to the first survey questions. The embedded program is one or more of: an add-on, an extension, a website browser extension, an application programming interface, a script or a plugin in a website browser. The method further includes dynamically modifying the first survey by automatically appending the respondent response to the first survey questions via the embedded program. The dynamically modified first survey, including website information extracted from the dynamically altered first survey including: website usability, website user friendliness, website searchability, and website veracity is provided to subsequent users and respondents.

In yet another aspect of the present disclosure receiving, via the graphical user interface, a respondent response to the first survey questions further includes: receiving one or more text inputs that supplement or replace an existing text of at least one of the first survey questions and the selectable first answer options.

In still another aspect of the present disclosure the method for dynamically creating and modifying an electronic survey includes accessing a survey creation tool on the website to create a survey, and receiving survey characteristics including structured survey questions, answer choices, and target demographic information from a survey creator user accessing the survey creation tool. The method further includes searching the database for questions and answer information from prior surveys matching the survey characteristics and extracting questions and answer information from prior surveys that match the survey characteristics. The method further includes offering to the survey creator user the questions and answer information from prior surveys having similarly structured survey questions, answer choices, and demographic information.

In yet another aspect of the present disclosure a system for providing a dynamic survey via a graphical user interface on a website includes a website with hardware and software server components. The hardware and software server components include non-standard or specialized components that perform services for website users and respondents, the specialized components including one or more databases storing previously collected surveys. The one or more databases are each in electronic communication with a non-transitory, processor-readable storage medium. The non-transitory processor-readable storage medium includes one or more programming instructions that, when executed, cause the processing device to: establish communication via the internet between a processing device and the one or more databases. The programming instructions further cause the processing device to access the one or more databases, each of the one or more databases having a storage medium storing one or more surveys, each of the one or more surveys having first survey questions. The programming instructions further cause the processing device to receive, via the graphical user interface on the website, a respondent input requesting a first survey within the database, wherein the graphical user interface includes input/output hardware in electronic communication with the processing device. The programming instructions further cause the processing device to present, via the graphical user interface, a respondent selected survey including the first survey questions. Each of the survey questions has selectable first answer options including a question modification option, an answer provision option, and an answer modification option. The programming instructions further cause the processing device to receive, via the graphical user interface, a respondent response to the first survey questions. The respondent response includes one or more of: selecting the question modification option and providing a modified or new question, selecting the answer provision option; and providing an answer to the one or more of the first survey questions, and/or selecting the answer modification option and providing a modified answer to the first survey questions. The programming instructions further cause the processing device to upload the respondent response to the first survey questions from the graphical user interface to the database via the processing device and through the internet. The programming instructions further cause the processing device to utilize an incentive system stored as programmatic control logic in the storage medium in electronic communication with at least one of the one or more databases and the processing device. The incentive system incentivizes users to author new survey questions and provide survey answers. Users accumulate credits within the incentive system that are redeemable for value in the form of one or more of: cash, goods, and services, or a chance to win one or more of cash, goods, and services. The credits accumulating in proportion to a quantity of respondents who have responded to a question generated by an authoring user. Respondents accumulate credits within the incentive system for each of certain predetermined surveys or survey questions to which the respondent responds. The programming instructions further cause the processing device to dynamically modifying the first survey by automatically appending the respondent response to the first survey questions, and the dynamically altered first survey is provided to subsequent users and respondents.

In still another aspect of the present disclosure the non-transitory processor-readable storage medium further includes one or more programming instructions that, when executed, cause the processing device to: receive, by the processing device, an input corresponding to a new question and one or more corresponding new answer choices for the new question. The programming instructions further cause the processing device to receive, by the processing device, a respondent selection of one or more of the new answer choices, and selectively append the respondent response to the first survey by: receiving a modification of one or more of the selectable first answer options, including: receiving an answer that more accurately reflects an opinion of the respondent than the selectable first answer options.

In yet another aspect of the present disclosure the non-transitory processor-readable storage medium further includes one or more programming instructions that, when executed, cause the processing device to: search the database for previous responses to the question modification option, the answer provision option, and the answer modification option. When the respondent response matches an existing response from the previous responses to the question modification option, the answer provision option, and the answer modification option, log by the processing device, the respondent response in the database as an additional one of the existing responses. When the respondent response does not match an existing response from the previous responses to the question modification option, the answer provision option, and the answer modification option, the processing device logs the respondent response in the database as a second new response.

In still another aspect of the present disclosure the non-transitory processor-readable storage medium further includes one or more programming instructions that, when executed, cause the processing device to dynamically modify the first survey further by: statistically aggregating the one or more respondent responses to produce updated survey results in real time, or by a batch process; and updating the first survey with the additional one of the existing responses and second new responses. The programming instructions further cause the processing device to receive a request for updated survey results, and provide, via the graphical user interface on the website, updated survey results to website users and respondents. The updated survey results are provided by presenting updated first survey questions from user and respondent selected surveys in the order of one or more of: a quantity of existing responses to the first survey questions, a quantity of second new responses to the first survey questions, and a quantity of responses to the answer provision option having matching answer selections.

In yet another aspect of the present disclosure the non-transitory processor-readable storage medium further includes one or more programming instructions that, when executed, cause the processing device to: prompt respondents to input a statement about particular subject matter, and analyze the statement with survey question generating software. The statement is submitted via the graphical user interface. The survey question generating software is stored as programmatic control logic in the storage medium in electronic communication with at least one of the one or more databases and the processing device. The statements include one or more of: sentences, numerical information, and computer software code. Utilizing the survey question generating software, new questions are extracted from the statement by performing one or more of: syntactic analysis, semantic analysis, and template-based analysis. The one or more new questions are provided to respondents as first survey questions.

In still another aspect of the present disclosure the non-transitory processor-readable storage medium further includes one or more programming instructions that, when executed, cause the processing device to: utilize an embedded program to access the one or more databases, receive the respondent input, present the survey matching the respondent input via the graphical user interface, and receive the respondent response to the first survey questions via the graphical user interface. The embedded program includes one or more of: an add-on, an extension, a website browser extension, an application programming interface, a script or a plugin in a website browser. The first survey is dynamically modified by automatically appending the respondent response to the first survey questions via the embedded program. The dynamically modified first survey, including website information extracted from the dynamically altered first survey including: website usability, website user friendliness, website searchability, and website veracity is provided to subsequent users and respondents.

In yet another aspect of the present disclosure the non-transitory processor-readable storage medium further includes one or more programming instructions that, when executed, cause the processing device to: provide a survey creation tool on the website to create a survey, and receive survey characteristics including structured survey questions, answer choices, and target demographic information from a survey creator user accessing the survey creation tool. The programmatic instructions further cause the processing device to search the database for questions and answer information from prior surveys matching the survey characteristics, and extract questions and answer information from prior surveys that match the survey characteristics. The programmatic instructions further cause the processing device to offer to the survey creator user the questions and answer information from prior surveys having similarly structured survey questions, answer choices, and demographic information.

In still another aspect of the present disclosure, a computing system that provides a dynamic survey via a graphical user interface on a website includes a website with hardware and software server components. The components include non-standard or specialized components that perform services for website users and respondents. The specialized components include one or more databases each in electronic communication with a non-transitory, processor-readable storage medium. The non-transitory, processor-readable storage medium stores one or more surveys and previously collected survey results relating to particular subject matter. The computing system further includes input/output hardware in electronic communication with a processing device. The input/output hardware receives respondent input including search criteria from a respondent requesting a survey, searches a database for survey questions matching the search criteria from the respondent input, and provides first survey questions via the graphical user interface on the website, including a modification of at least one of the first survey questions, wherein the modification corresponds to a revised question that more accurately reflects an opinion of a respondent than the first survey questions.

The non-transitory processor-readable storage medium stores one or more programming instructions that, when executed, cause the processing device to: establish communication via the internet between a processing device and the one or more databases, and access, via the processing device, one or more surveys stored in the one or more databases, each of the one or more surveys having first survey questions. The programmatic instructions further cause the processing device to receive, via the graphical user interface on the website, a respondent input selecting a first survey within the database, and receive, by the graphical user interface on the website, a respondent input corresponding to a new question and one or more corresponding new answer choices for the new question. The programmatic instructions further cause the processing device to search the database for previous responses to the question modification option and the answer modification option. When the respondent response matches an existing response from the previous responses to the question modification option and the answer modification option the processing device logs the respondent response in the database as an additional one of the existing responses. When the respondent response does not match an existing response from the previous responses to the question modification option and the answer modification option the processing device logs the respondent response in the database as a second new response. The programmatic instructions further cause the processing device to receive a respondent selection of the one or more new answers; and provide, the new question and the corresponding new answer or answers to one or more users for approval. The programmatic instructions further cause the processing device to present, via the graphical user interface, a user selected survey including the first survey questions, each of the survey questions having selectable first answer options including a question modification option and an answer modification option. The programmatic instructions further cause the processing device to receive, via the graphical user interface, a respondent response to the first survey questions, wherein the respondent response includes one or more of: selecting the question modification option and the selecting the answer modification option. The programmatic instructions further cause the processing device to upload the respondent response to the first survey questions to the database via the processing device and through the internet. The programmatic instructions further cause the processing device to dynamically modify the first survey based on the respondent response to the first survey questions by automatically appending the respondent responses to the first survey questions by: statistically aggregating the one or more respondent responses to produce updated survey results in real time, or by a batch process; presenting the updated survey results in the order of one or more of: a quantity of existing responses to the first survey questions, a quantity of second new responses to the first survey questions, a quantity of responses to the answer provision option to be defined with matching answer selections. The programmatic instructions further cause the processing device to utilize an incentive system stored as programmatic control logic in the non-transitory processor-readable storage medium in electronic communication with at least one of the one or more databases and the processing device, the incentive system incentivizing respondents to author new survey questions and provide survey answers. Respondents accumulate credits within the incentive system that are redeemable for value in the form of one or more of: cash, goods, and services, or a chance to win one or more of cash, goods, and services. The credits accumulate in proportion to a quantity of respondents who have responded to a question generated by an authoring respondent, and wherein respondents accumulate credits within the incentive system for each of certain predetermined surveys or survey questions to which the respondent responds. The programmatic instructions further cause the processing device to prompt respondents to input a statement about particular subject matter. The programmatic instructions further cause the processing device to analyze the statement with survey question generating software. The statement is submitted via the graphical user interface. The survey question generating software is stored as programmatic control logic in the storage medium in electronic communication with at least one of the one or more databases and the processing device. The statements include one or more of sentences, numerical information, and computer software code. The programmatic instructions further cause the processing device to utilize the survey question generating software to extract new questions from the statement by performing one or more of: syntactic analysis, semantic analysis, and template-based analysis. Respondents are provided the one or more new questions as first survey questions. The computing system further includes a display that displays the graphical user interface with the first survey questions to the respondent.

In yet another aspect of the present disclosure the processing logic further selectively appends the respondent response to the first survey by: receiving a modification of the selectable first answer options. The selectable first answer options include receiving an answer that more accurately reflects an opinion of the respondent than the selectable first answer options.

In still another aspect of the present disclosure, the processing logic further accesses a survey creation tool on the website to create a survey; receives survey characteristics including structured survey questions, answer choices, and target demographic information from a survey creator user accessing the survey creation tool, and searches the database for questions and answer information from prior surveys matching the survey characteristics. The survey creation tool extracts questions and answer information from prior surveys that match the survey characteristics. The survey creation tool offers to the survey creator user the questions and answer information from prior surveys having similarly structured survey questions, answer choices, and demographic information, and utilizes an embedded program to access the one or more databases; receive the respondent input; present via the graphical user interface, the survey matching the respondent input, and receive via the graphical user interface, the respondent response to the first survey questions. The embedded program includes one or more of: an add-on, an extension, a website browser extension, an application programming interface, a script or a plugin in a website browser. The survey creation tool dynamically modifies the first survey by automatically appending the respondent response to the first survey questions via the embedded program. The dynamically modified first survey, including website information extracted from the dynamically altered first survey including: website usability, website user friendliness, website searchability, and website veracity is provided to subsequent users and respondents.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
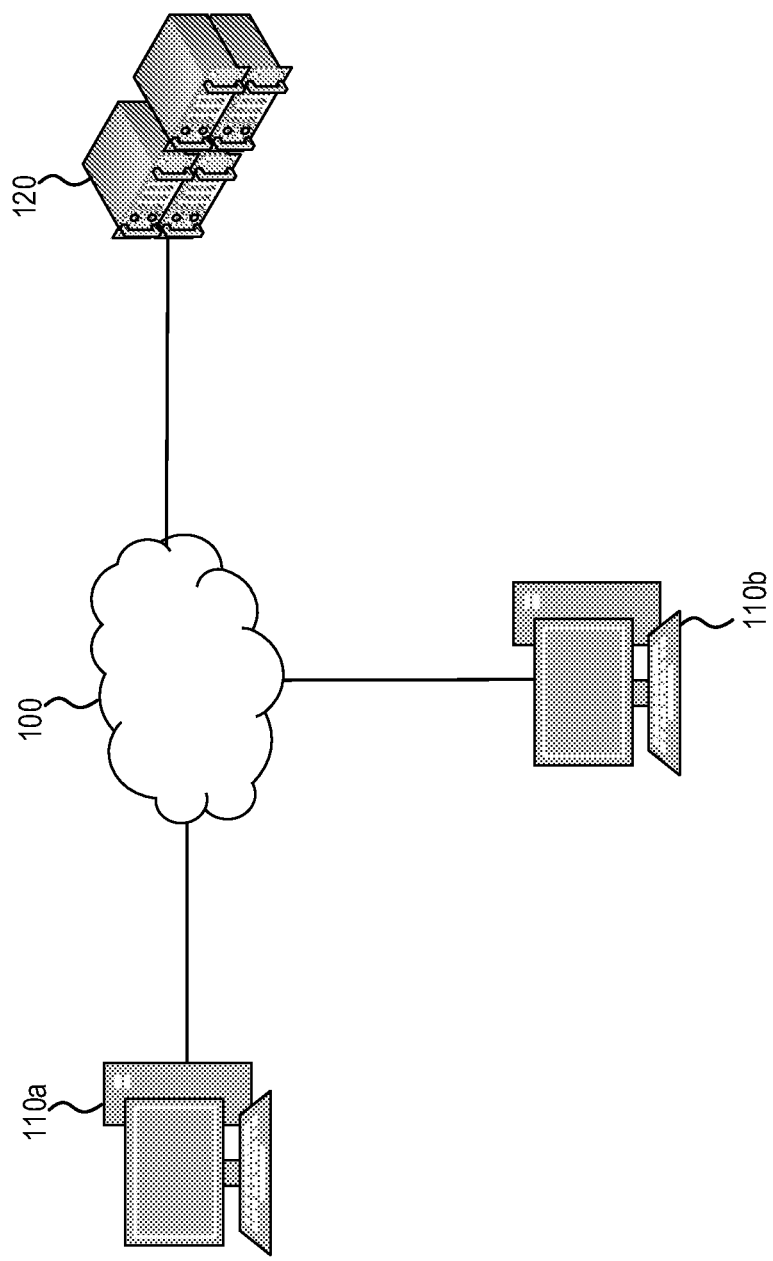
FIG. 1 is a schematic depiction of an illustrative computing network for a system for collecting and/or distributing dynamic survey information according to one or more embodiments shown and described herein.

The following description is merely exemplary in nature and is not intended to limit the present disclosure, application, or uses.

Referring generally to the figures, embodiments described herein are directed to electronic survey systems and methods for providing one or more survey questions that are each structured in a manner so as to elicit a response from a respondent that accurately allows the respondent to express his or her opinion without being specifically limited to the plurality of response choices that are provided with each survey question. As such, the systems and methods described herein enable a respondent to modify a static survey in such a manner that the survey asks more relevant questions and/or provides more suitable options for answers that better represent the respondent's opinions, relative to a static survey that does not allow for modification of survey responses. In addition, the systems and methods described herein enable a user to find a survey result on any subject matter via a search or by conducting a new survey.

The electronic survey systems and methods described herein may operate as an Internet website and/or provide functionality on a website such that a user browsing to the website can search for a survey, create a survey, view and/or download data regarding a survey, take a survey, and/or modify survey contents (e.g., modify survey questions and/or answers). The Internet may be an ideal medium for conducting surveys because a vast number of potential survey respondents that have access to the Internet through client computer systems. Surveys related to such things as automobile owner satisfaction, consumer products reviews, political issues, television program ratings, restaurant and hotel reviews, opinion polls, and/or the like can be effectively and inexpensively conducted over the Internet.

In fact, the Internet is replete with electronic technology such as online survey websites and social media apps where individuals can express their opinions by posting typed comments, but such comments may have little or no value to the general public interested in the combined opinion of a population since the comments only represent the opinion of one individual and not of a population or a specific demographic. Some websites conduct surveys on specific populations such as on the website visitors themselves, but there is little or no value of such surveys to the general public interested in survey results because the general public does not know the survey information exists (or where to find it), results may not be available to the public, the survey respondent population is limited to a specific demographic (website visitors), and the authenticity of the responses is questionable at best.

For example, some merchants or search engines may conduct "pop-up" surveys related to various subjects, such as to a user friendliness of a site (i.e. to rate the website) or perhaps political issues (i.e. who will you vote for?). However, the results of such surveys are limited in that they are biased toward the opinions of respondents who happen to be visitors of a particular website. Moreover, such surveys are not guarded against deceptive individuals that have provided multiple responses to the same survey question, thereby possibly skewing the results. In addition, survey results are not necessarily available to respondents or the general public, surveys are related to very specific subject matters, which may not have widespread interest.

Some websites may enable registered members to find reviews and to express their opinions with reviews on businesses, services, or the like such as, for example, restaurants, spas, and coffee shops. However, the potential respondent pool is limited and no method of verifying that the reviewer actually has used the product or service for which she or he is writing a review exists. Although in some instances, users must register with the site, which requires providing a valid email address for verification. However, all other personal and demographic information can be fabricated, and a valid email address can be created by virtually anyone without reliable identity verification.

Other websites may enable users to post comments and access posted comments on any subject, including subjects tagged with an identifier, such as a "hashtag," (e.g., words/phrases indicated with the # symbol), which is a type of label or metadata tag which enables users to find posts regarding a particular subject. Users place the hash character(#) in front of a word or phrase within the posting. Upon searching for the hashtag, users can find all posts containing the hashtag. Unfortunately, the search results will provide hundreds, if not thousands of postings matching the hashtag, which are ultimately multiple individuals' posted comments with little value to someone seeking a population's combined opinion that is structured and discernible as survey results to a particular question.

Surveys may be used to study a sampling of individuals from a population with a view towards making statistical inferences about the population being studied. For example, public opinion polls and market research surveys may use survey methodology to answer questions about a population. As such, surveys may provide important information for all kinds of relevant public information and research fields in a structured and measurable manner.

A typical survey conducted on a sample of a population may be in a questionnaire-type format, which includes one or more questions. Each of the one or more questions may be paired with a plurality of preselected choices for answers (or items) about a given subject. A user selects one of the preselected choices, which is logged with the survey results, which can then be used to statistically aggregate the responses from the sample population.

While online survey results and posted comments from present art technology express the opinions of individuals, an advantage of online surveys over posted comments is that survey respondents are required to express their opinion in a standardized and structured manner by answering specific questions having predetermined choices such that the answers can be aggregated from multiple respondents (i.e., by demographic) into valuable information the public may use. Posted comments, on the other hand, may not be easily aggregated or combined to provide a composite response without reading each individual comment, extracting information from the comment, and combining the extracted information with other similar information extracted from other comments into a combined result.

Structured survey questions rely on closed-ended categories and choices for answers pre-selected by the surveyor. Such structured questions may require less thinking from the respondent and may generally lead to higher response rates and more accurate data. Such structured questions may also be easier for the surveyor to code and analyze. Structured questions may include, for example, a single response with nominal or ordinal categories (e.g. "From the following list please select your highest level of education"), multiple response (e.g. "From the following list of deodorants, please select any that you may have used"), scaled questions (e.g. "Humans are responsible for global warming—Strongly Agree to Strongly Disagree"), and/or the like.

While posted comments, reviews, and open-ended questions may enable individuals to freely express their opinions, structured survey questions and the options provided for answers may not fully reflect a respondent's opinion on a particular survey topic. That is, a particular question may not be phrased such that the respondent is enabled to provide a frank and genuine response. For example, a survey may ask "Do you disagree with experts about global warming?" and provide "yes" and "no" options for responding. However, responding to this survey question may not reflect a respondent's complete and more nuanced opinion about this subject, as a particular respondent may believe the globe is warming but may doubt that man is responsible. As such, the respondent may find that a better question to ask in order to capture its actual opinion may be "Do you believe human activity is responsible for global warming?" Similarly, the options provided for answers may not fully express a respondent's opinion (e.g., a simple "yes" or "no" option to the question posed above). Rather, certain answers that may more accurately reflect a respondent's opinion may include, but are not limited to, "no, provided humans are not responsible for global warming", and "yes, assuming experts claim humans are responsible."

Some online survey providers may enable users to create and conduct private surveys on pre-selected populations, but since such surveys are private, the results are not available to the general public. Moreover, the survey questions cannot be modified or added by respondents for the purposes of answering survey questions more accurately. As such, the survey questions on a particular subject are static (not dynamic). That is, such surveys cannot not evolve with respondents' curiosity and inquisitiveness.

Survey providers do not enable respondents to modify survey questions and/or responses or add follow-up survey questions and/or answers because such providers would not be able to obtain respondents' answers to specified predetermined static questions. However, if multiple respondents in a population choose to modify the same survey questions and/or responses in a certain way, or to add a new follow-up question and/or response, this may indicate that the modified question is a more appropriate question to ask, and/or the modified and follow-up question(s) and/or responses may allow each respondent to express his/her opinion more accurately.

As such, certain online surveys may prevent respondents from fully expressing opinions because the survey questions and answers may not be appropriately phrased to enable a genuine or accurate response. In addition, free text comment postings are difficult to aggregate into a composite response and may have little or no value since statistical inferences about the population may be difficult or impossible to obtain.

Thus, an individual interested in finding statistically meaningful, current, dynamic, and/or reliable opinions on any subject must rely on present art technologies that have difficult to aggregate comments and reviews, stale and static surveys, a limited respondent pool, and/or questionable results authenticity. The present disclosure provides an improved technology (e.g., via a website) that one or more members of the general public can access to find public opinions as responses to structured survey questions on any topic and subject matter and/or conduct their own surveys on subject matters of their own interest. In addition, the present disclosure provides general public opinion that is updated in real time and/or allow the surveys to evolve dynamically in such a manner that reflects the public's interests, inquisitiveness, and curiosity.

As will be apparent from the present disclosure, the systems and methods described herein generally improve the functionality of a computing device by allowing it to more accurately provide surveys to users than was previously possible (i.e., provide surveys that are more relevant to a user) and/or more accurately provide search results in response to a search request because the systems and methods described herein are particularly configured for the purposes of allowing updates to existing surveys and using the content of existing and updated surveys to produce more pointed search results. In addition, the systems and methods described herein exist solely within the realm of computers and the Internet because non-computer based surveys (e.g., paper surveys and the like) would not be able to provide modification functionality, accurate searching abilities, and/or provision to a large audience anywhere in the world. In some examples, the website used to access the survey database includes hardware and software server components including non-standard or specialized components that perform services for web site users. The specialized components, and in particular the survey database, may more specifically include a questionnaire database and a survey answers database storing previously collected survey results relating to particular subject matter. In some instances, previously collected survey results include a composite survey response.

As used herein, a "user" refers to any individual that interacts with any of the components described herein. As such, the user may be, for example, a person creating a survey, a person responding to a survey, or a person obtaining survey data. In embodiments where the user is a person responding to a survey, the user may be referred to as a "respondent."

Referring now to the drawings, FIG. 1 depicts an illustrative computing network that depicts components for a system for collecting and/or distributing dynamic survey information according to embodiments shown and described herein. As illustrated in FIG. 1, a computer network 100 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user computing device 110a, a server computing device 120, and an administrator computing device 110b.

The user computing device 110a may generally be used as an interface between a user (e.g., a person creating a survey, a person responding to a survey, a person obtaining survey data, and/or the like) and the other components connected to the computer network 100. Thus, the user computing device 110a may be used to perform one or more user-facing functions, such as receiving one or more inputs from a user or providing information to the user, as described in greater detail herein. Accordingly, the user computing device 110a may include at least a display and/or input hardware, as described in greater detail herein. Additionally, included in FIG. 1 is the administrator computing device 110b. In the event that the server computing device 120 requires oversight, updating, or correction, the administrator computing device 110b may be configured to provide the desired oversight, updating, and/or correction. The administrator computing device 110b may also be used to input additional data into a corpus stored on the server computing device 120 (e.g., a corpus of electronic surveys and/or responses, a corpus of offline surveys and/or responses, or the like).

The server computing device 120 may receive data from one or more sources, store data, index data, search data, and/or provide data to the user computing device 110a in the form of survey questionnaires, survey creation tools, survey modification tools, search results, visual representations, documents, excerpts from documents, and/or the like.

It should be understood that while the user computing device 110a and the administrator computing device 110b are depicted as personal computers and the server computing device 120 is depicted as a server, these are nonlimiting examples. More specifically, in some embodiments, any type of computing device (e.g., mobile computing device, personal computer, server, etc.) may be used for any of these components. For example, the user computing device 110a may be a mobile device upon which the user takes a survey, amends survey questions and/or responses, creates a survey, accesses survey related data, and/or the like. Additionally, while each of these computing devices is illustrated in FIG. 1 as a single piece of hardware, this is also merely an example. More specifically, each of the user computing device 110a, server computing device 120, and administrator computing device 110b may represent a plurality of computers, servers, databases, components, and/or the like.

Figure 2:
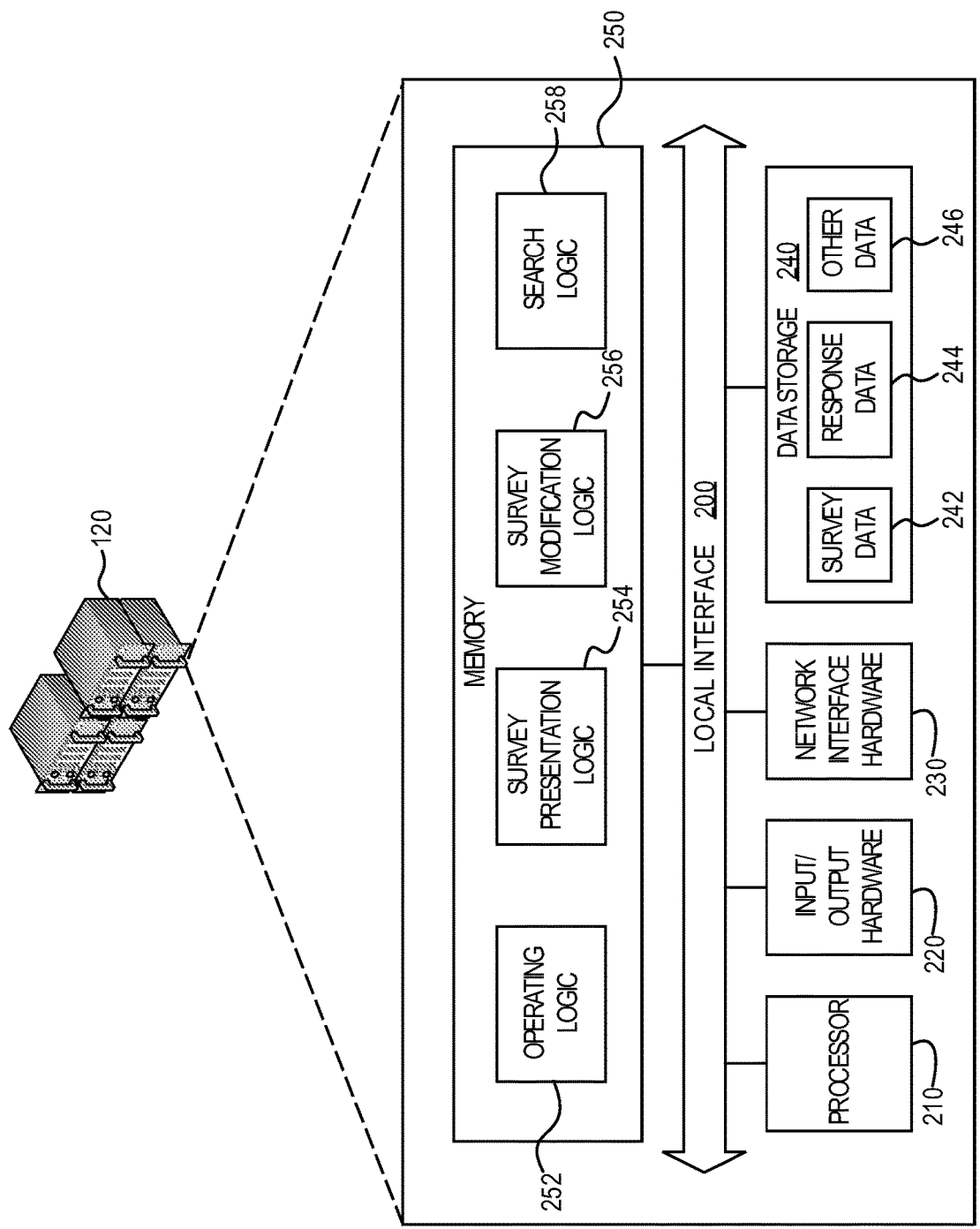
FIG. 2 is a schematic depiction of the server computing device from FIG. 1, further illustrating hardware and software that may be used in collecting and/or distributing dynamic survey information according to one or more embodiments shown and described herein.

FIG. 2 depicts the server computing device 120, from FIG. 1, further illustrating a system for receiving data from one or more sources, storing data, indexing data, searching data, and/or providing data. In addition, the server computing device 120 may include a non-transitory computer-readable medium for searching and providing data embodied as hardware, software, and/or firmware, according to embodiments shown and described herein. While in some embodiments the server computing device 120 may be configured as a general-purpose computer with the requisite hardware, software, and/or firmware, in some embodiments, the server computing device 120 may also be configured as a special purpose computer designed specifically for performing the functionality described herein.

As also illustrated in FIG. 2, the server computing device 120 may include a processor 210, input/output hardware 220, network interface hardware 230, a data storage component 240 (which may store survey data 242, response data 244, and other data 246 such as user demographic data), and a non-transitory memory component 250. The memory component 250 may be configured as a volatile and/or a nonvolatile computer-readable storage medium and, as such, may include random access memory (including SRAM, DRAM, and/or other types of random access memory), flash memory, registers, compact discs (CD), digital versatile discs (DVD), and/or other types of storage components. Additionally, the memory component 250 may be configured to store various processing logic, such as operating logic 252, survey presentation logic 254, survey modification logic 256, and/or search logic 258 (each of which may be embodied as a computer program, firmware, or hardware, as an example). A local interface 200 is also included in FIG. 2 and may be implemented as a bus or other interface to facilitate communication among the components of the server computing device 120.

The processor 210 may include any processing component configured to receive and execute program instructions (such as from the data storage component 240 and/or memory component 250). The input/output hardware 220 may include a monitor, keyboard, mouse, printer, camera, microphone, speaker, touchscreen, and/or other device for receiving, sending, and/or presenting data. For example, in some embodiments, the input/output hardware may receive one or more user inputs such as modifications questionnaire questions and/or answers. In some embodiments, the input/output hardware 220 may also include a display that displays information to a user. For example, the display may display survey questions to a respondent, search results to a user, a modification interface, a searching interface, and/or the like. The network interface hardware 230 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 240 may reside local to and/or remote from the server computing device 120 and may be configured to store one or more pieces of data and selectively provide access to the one or more pieces of data. As illustrated in FIG. 2, the data storage component 240 may store survey data 242, response data 244, and/or other data 246, as described in greater detail herein.

Included in the memory component 250 are the operating logic 252, the survey presentation logic 254, the survey modification logic 256, and/or the search logic 258. The operating logic 252 may include an operating system and/or other software for managing components of the server computing device 120. The survey presentation logic 254 may generate surveys, provide surveys to one or more users, receive one or more survey inputs (e.g., responses), and/or aggregate survey data. The survey modification logic 256 may receive modification inputs from one or more users, modify surveys, provide modified surveys to one or more users, receive one or more modified survey inputs (e.g., modified responses), provided modifications to users for approval, and/or aggregate modified survey data. The search logic 258 may be configured to generate search queries from a user input within the graphical user interface.

It should be understood that the components illustrated in FIG. 2 are merely illustrative and are not intended to limit the scope of this disclosure. More specifically, while the components in FIG. 2 are illustrated as residing within the server computing device 120, this is a nonlimiting example. In some embodiments, one or more of the components may reside external to the server computing device 120. Similarly, while FIG. 2 is directed to the server computing device 120, other components such as the user computing device 110a and the administrator computing device 110b may include similar hardware, software, and/or firmware.

Figure 3:
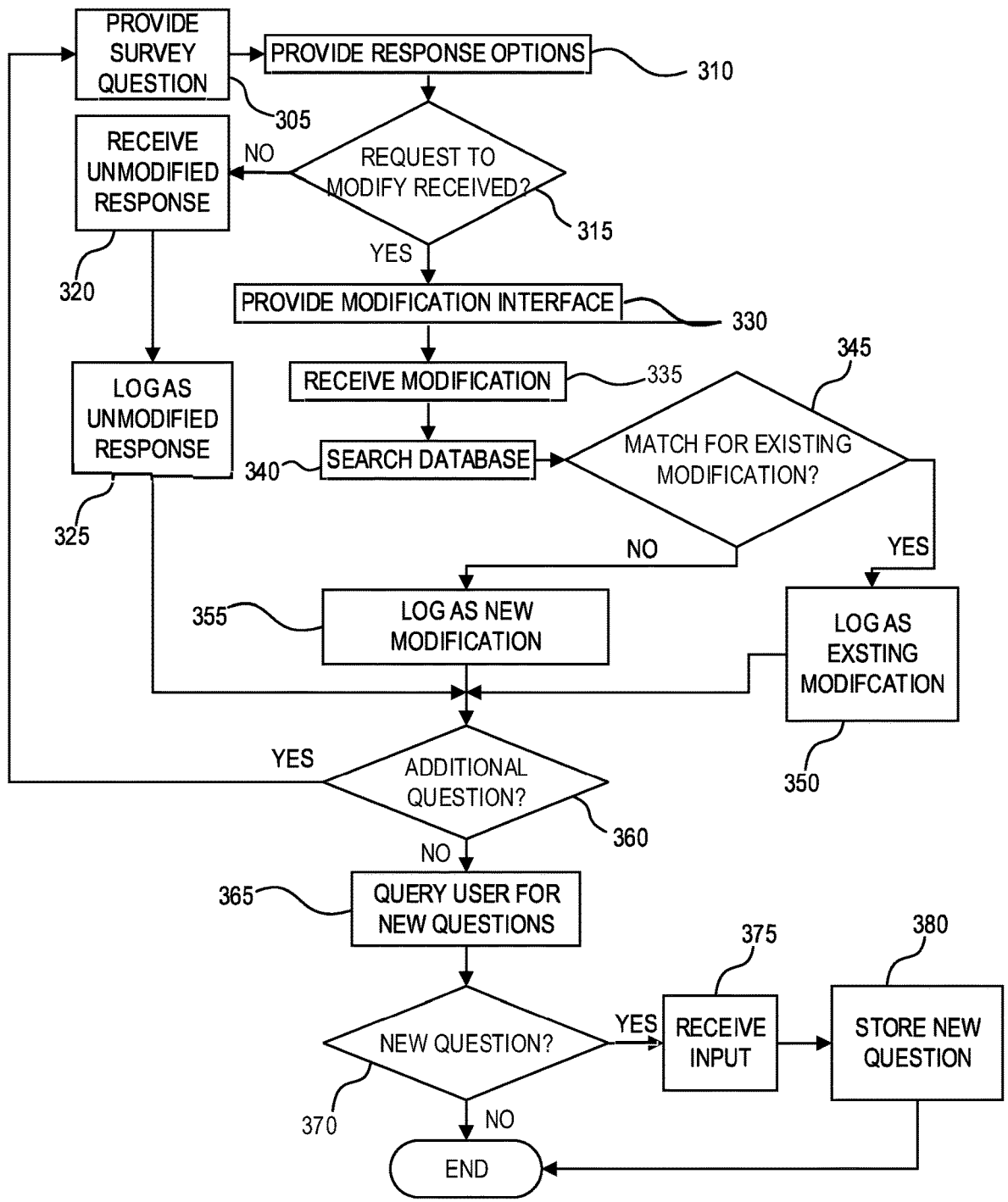
FIG. 3 depicts a flow diagram of an illustrative method of providing a dynamic survey and receiving responses according to one or more embodiments shown and described herein.

FIG. 3 depicts a block diagram of an illustrative method of providing a dynamic survey and receiving responses thereto according to an embodiment. The method described with respect to FIG. 3 may generally be carried out on a network (e.g., the Internet) via a website, a mobile app, or the like. However, it should be understood that the method is not solely limited to network-based activities and may be carried out in other manners without departing from the scope of the present disclosure. In addition, certain logic may be used to carry out the various processes, such as, for example, the survey presentation logic 254 and the survey modification logic 256 (FIG. 2).

According to the method described herein with respect to FIG. 3, a survey is generally provided to a user and one or more inputs are received from the user. As will be apparent from the description provided below, a survey includes a questionnaire (e.g., a set of one or more structured questions and corresponding preselected choices for answers). A survey question is a linguistic expression used to make a request from a respondent for a response selected from the one or more choices for answers. As will be described in greater detail herein, the responses from respondents are statistically aggregated to produce a composite survey response (or survey results).

A survey question is provided at step 305. The survey question may be a first question in a plurality of questions, and may be presented, for example, via a user interface. In some embodiments, the survey question may be provided alone at step 305. In other embodiments, the survey question may be provided along with one or more other survey questions at the same time at step 305.

In addition to the survey question, a plurality of response options may also be provided at step 310. That is, each survey question may be provided with a plurality of possible responses that correspond to the survey question. For example, a survey question may be "What is your age?" and the plurality of possible responses may be "18-24 years old," "25-36 years old," "36-50 years old," and "51 years old or older." The possible responses may be selectable by a respondent in a user interface such that the user can select the most appropriate response.

In some embodiments, a survey question may be provided with a free text answer option, where the respondent may be asked to provide an answer written in the respondent's own words. The answer may be a single word, a group of words, or sentence answering the survey question. A textual analysis or semantic tool may be used to analyze the written answer and provide the respondent with potential choice options for rephrasing the answer to a more standardized or structured version, which may be easier to aggregate into a composite survey result.

At step 315, a determination may be made as to whether a request to modify a question and/or a response has been received. That is, an input may be received that indicates that a user desires to modify the question and/or the response (e.g., a user clicks on a "modify" button in a user interface, the user highlights text to be modified, or the like).

If the determination is made that the user does not wish to modify the question and/or an answer (e.g., no indication of an intent to modify is received), an unmodified response may be received at step 320. That is, the input that is received may generally be a user selection of one of the plurality of provided responses. Accordingly, the user response is logged at step 325. Logging the user response generally includes storing the response in a survey database (e.g., the survey data 242 and/or the response data 244 of FIG. 2) and/or statistically combining the response with other responses to the same question for the purposes of providing statistical data, as described in greater detail herein. In addition, logging the response in this manner allows for a continually updated body of survey results that is instantly available for use (e.g., viewing aggregated results, etc.).

If the determination is made that that the user does wish to modify the question and/or an answer (e.g., if a question and/or an answer is not found to the user's liking), a modification interface may be provided at step 330. Such a modification interface may be, for example, a portion of the user interface that is particularly structured and/or configured to provide the user with one or more options to modify the question and/or an answer thereto and/or one or more options to submit the modified question and/or answer. For example, the modification interface may include a text box that allows the existing text of the question or answer to be replaced, appended, or the like, a display of a list of selectable options including the modified questions and modified answers previously provided by other users, a text box that may be used to provide additional text (e.g., another answer to a question that is in addition to the existing possible answers), and/or existing text that is modifiable.

At step 335, the modification may be received. That is, an input may be received that corresponds to a modified question and/or a modified answer. The modification generally corresponds to a question and/or an answer that more accurately reflects the respondent's opinion than any of the initially provided questions and/or answers thereto. In addition, the input includes of the user's selected response, which in some embodiments may be the modified answer. Such inputs may be in the form of text entry that supplements or replaces the existing text of the question and/or answer. For example, if the existing answers to a question regarding whether the respondent believes in global warming are "yes" and "no," an illustrative modification that may be received for those answers may be "yes, but not due to human activity." In some embodiments, a modification may not be a change or supplementation of an existing entry but may rather be a wholly new entry. For example, if a question has two possible responses that do not accurately capture the respondent's opinion, the respondent may opt to provide a third possible response as a modification. In another example, if a series of questions regarding a particular subject do not accurately depict the respondent's opinion, the modification may be made to accurately provide the respondent's opinion. In some embodiments, the modification may only be a modified existing response or a wholly new response. That is, in instances where the modification is a wholly new response, the respondent is not provided with an ability to select an "other" option (or the like) and enter clarifying text in a provided text box. Rather, the wholly new response involves the respondent indicating that a wholly new response is entered (either by adding another response option, bullet point, check box or the like) and typing in the wholly new response. As such, the modification is not merely an open-ended option.

The modification may be added to the survey and stored in a survey database so that other users can find, view, and respond to the modification upon searching the database, as described in greater detail herein. The modification may also be linked the original question and/or answers such that the modification is cross referenced with the original question and/or answers.

To ensure that the modification is appropriately added and stored, the database may be searched at step 340 and a determination may be made at step 345 as to whether the modification is a match to an existing modification that was previously made and entered in the database. That is, a determination is made at step 345 by searching the database for text that corresponds to the modified text. The search may include searching for modifications that are an exact match as well as modifications that are substantially similar (e.g., contain different spellings, different punctuation, semantic similarities, or the like). As such, this step may avoid multiple duplicate modifications to the same question and/or answer.

If the modified text is a match for a modification stored in the database (e.g., an exact match or a substantially similar match), the modification may be logged as an existing modification at step 350. That is, rather than logging the modification as a separate entry from other similar/substantially similar modifications in the database, the existing entry in the database may be appended with an indicator. In some embodiments, such an indicator may be a count of the number of times that the same modification has been inputted for the purposes of statistical analysis (e.g., how often a particular modification is made, etc.). In some embodiments, such an indicator may include a variation (e.g., to account for variations m spelling, variations in punctuation, variations in semantically similar terms/phrases, and/or the like).

If the modified text is not a match for a modification stored in the database, the modification may be logged as a new modification at step 355. That is, a new entry is created for the modification, which can be used for comparison with future modifications, for statistical analysis, and/or the like.

At step 360, a determination may be made as to whether an additional question exists for the survey that has not yet been answered. For example, such a determination may include determining that the respondent has not yet reached the end of the survey, that the respondent has not responded to a particular question, that the respondent has requested to move on to the next (or any other) question, and/or the like. If an additional question exists, the process may return to step 305. In some embodiments, additional questions may include additional or modified questions previously provided by other users.

In some embodiments, the respondent may be queried at step 365 as to whether he or she wishes to create an additional question for the survey. For example, a user may determine that the survey is incomplete, fails to ask a particular question, does not cover a particular subject, and/or the like, and may wish to supply proposed questions to be added to the survey. The query may be, for example, a pop-up notification that is provided via the user interface once the user has answered all of the questions, a clickable button that the user may select at any point while responding to the survey, and/or the like.

At step 370, a determination may be made as to whether the user wishes to enter a new question and corresponding answers thereto. That is, the determination may be made as to whether a user clicks on a button to provide a new question, whether the user responds in the affirmative to a query, and/or the like. If the user does not wish to enter a new question, the process may end.

If the determination is that a user does wish to enter a new question for the survey, the user input may be received at step 375. The user input may include the question and a plurality of corresponding answers to the question. In addition, the input may also receive the user's selected response from the plurality of answers. The new question and the corresponding new answers thereto (as well as the user's selected response, if any) is stored at step 380 as being appended to the survey. In some embodiments, the question and the answers may be reviewed and approved before the question is appended to the survey. For example, the question may be provided to one or more additional users for a determination of whether the question should be appended to the survey, may be provided to an administrator user (e.g., a user of the administrator computing device 110b of FIG. 1), and/or the like. If the question and the answers are approved, they may be appended to the survey. If the question and the answers are denied, they may not be appended to the survey. The question and the answers may be further modifiable before they are appended to the survey. That is, one or more users may modify any portion of the question and/or the answers, provide additional possible answers, and/or the like. The question and the corresponding answers may then be stored at step 380. The question and/or the corresponding answers may be stored, for example, within the survey data 242 (FIG. 2).

Figure 4:
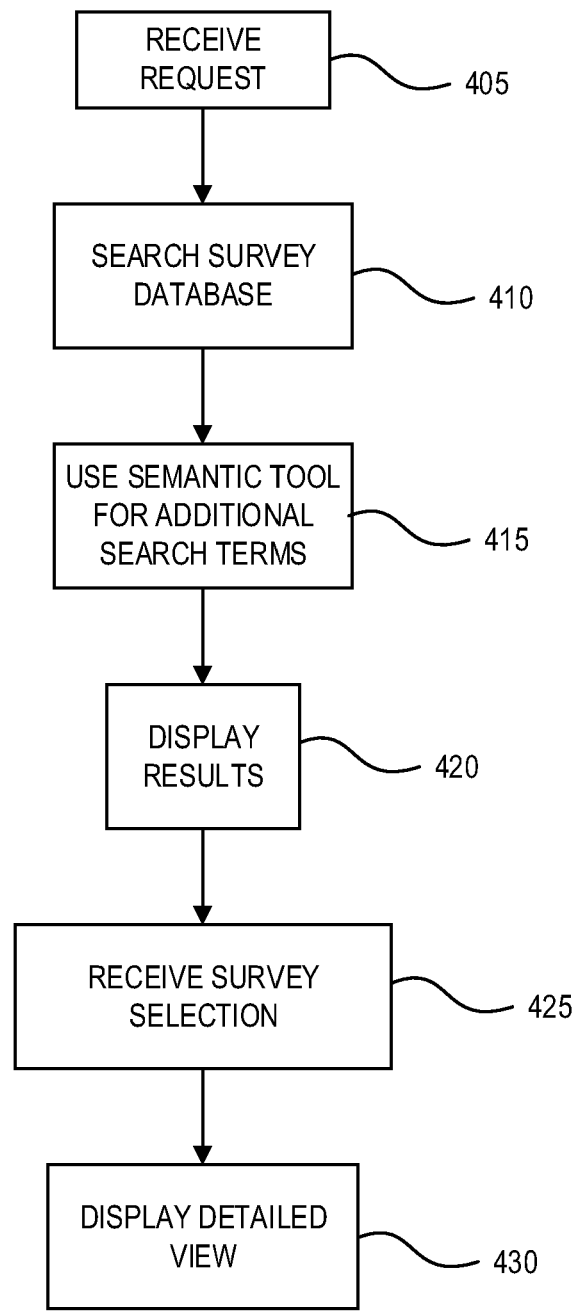
FIG. 4 depicts a flow diagram of an illustrative method of searching and obtaining survey data according to one or more embodiments shown and described herein.

The various databases that are used to store survey data obtained according to the method described herein with respect to FIG. 3 may be searchable using the search logic 258 (FIG. 2). The flow diagram of FIG. 4 depicts one such illustrative method of searching and obtaining survey data according to an embodiment. Certain logic may be used to carry out the processes described with respect to FIG. 4, such as, for example, the search logic 258 (FIG. 2).

Users who wish to find survey results and/or respond to a survey on a particular subject may submit a request for information, which is received at step 405. For example, a request may be received via a submission whereby an input that includes language or search expressions are provided via a user interface (e.g., in a search field). Illustrative examples of inputs that may be received include, but are not limited to, such a survey question of interest, a subject matter, a related keyword or object (such as images or sounds), a predetermined survey identifier such as a code, and the like.

At step 410, the survey database may be searched to find language or other indicia matching the search expressions. In some embodiments, a semantic tool (e.g., a thesaurus or the like) may be used to find additional survey matches at step 415. One or more search results that include matching surveys, including the questions and/or answers thereof, may be displayed to a user at step 420. In some embodiments, the results may be displayed in an order selected by the user. For example, the results may be displayed in order of decreasing number of respondents or by age of the survey. At step 425, a selection of a particular survey may be received as an input. Thus, at step 430, additional details regarding the selected survey may be provided.

In an illustrative example, the user may type "global warming" in a search field. Upon clicking the search button, the one or more survey databases are searched for survey questions and answers containing the words "global warming," any other similar words, and/or related phrases such as "climate change" or "carbon footprint." The search results are then provided, which indicate surveys matching the search criteria in the order selected by the user, such as search words match accuracy, or by number or respondents to each survey, such that most popular surveys are presented first automatically. That is, the more frequently a survey is responded to, the closer to the beginning of the search results the survey will be displayed. Thus, the most frequently accessed or most popular surveys are provided to the user first in the list of search results. The user may then review (e.g., scroll through) the surveys or questions that are displayed, and may optionally choose which survey to view in further detail. Upon selecting a particular survey to view in further detail, questionnaire questions and/or the survey results may be displayed. In some embodiments, the results may be further broken down by demographics such as by gender, age, income, geography, etc.

If the user wishes to respond to a survey found in the search results, the application presents to the user the survey questions and options for answers and enables the user to provide a response. The user then responds to the survey questions of interest by selecting the answers from the available options.

Once the user responds to a survey question, the selected answer is logged in the survey database as a response to the survey question provided by that user, and the answer is then statistically combined with the previously collected survey responses, such as survey responses from other respondents to the survey, in order to update the survey results for the question. Survey responses provided by an individual user remain associated with that individual user in the survey database as a historical record of survey responses for each user, thus allowing database users the ability to ascertain how an individual respondent's opinion has changed over time.

If the user determines that selecting from existing options for answers to a corresponding survey question does not reflect the user's opinion accurately, the user is presented with an option to provide a new option for their answer, as well as an option to submit a new answer to the question. The new answer is logged as an additional answer corresponding to the survey question and becomes available as an additional option for an answer to subsequent respondents to the survey question.

In some embodiments, users are asked to provide open-ended responses to survey questions. That is, users are asked to respond by providing an answer in their own words without previously viewing preselected answer choices. Accordingly, when asked to provide open-ended responses, respondents are less likely to form preconceived notions, or prejudices which might otherwise be evoked by the preselected answer choices. Once the respondent provides the open-ended answer, the system uses an online or internal semantic tool (such as a thesaurus, and grammar correcting software, or the like) to find one or more standardized versions of the answer's wording (such as a rephrased version of the answer), from which the respondent can select the option which best reflects the respondent's opinion. If none of the standardized versions of the answer are satisfactory to the user, then the user is given the option to use the wording of the answer provided by the user.

Similarly, if the user determines that responding to a survey question will not reflect the user's opinion accurately, the user is given the option to submit to the system a modified survey question, and one or more corresponding options for answers. The modified survey question may be a rephrased version of the original survey question, or a new question that the user has determined is more relevant in relation to the subject matter of the original question. Thus, the user's response to the original survey question is to provide a modified question, which upon responding will more accurately reflect the user's opinion, than the original question, or the original answer choices to the original question.

The modified survey question is logged in the database as a response to the original survey question and as a new survey question. Modified survey questions provided as a response to original survey questions are in turn provided as a new option for responses in addition to the preselected answer choices corresponding to the original survey question. In this manner, subsequent users who find that responding to the modified survey question reflects their opinion more accurately than responding to the original survey question may choose to respond to the modified survey question instead of the original survey question. The modified question is also searchable in the database, just as the original question. Additionally, the modified question may appear higher or earlier in the search results depending on database search criteria. Thus, a modified survey question may eventually receive more responses than an original question. Thus, surveys using this system and method are not static with a set quantity of questions but are dynamically modified as users add and modify new questions and answer options.

In addition, users are enabled to create new follow-up questions and corresponding answer choices that are linked to original survey questions. The follow-up questions and answers are stored in the survey database and made available to other users to find, view, respond, and modify. In some examples, follow-up questions may be conditional on selecting a certain answer from an existing survey question. For example, a follow-up question may be asked only if a respondent selected a specific answer choice in a previous question.

Users who wish to create a new survey question must first determine if existing survey questions in the survey database match the new survey question. In order to determine if any existing survey questions match the new survey question, the user submits (i.e. types in a search field) the new question to search the survey database. If no existing survey question in the survey database matches the new question, then the user is enabled to create a new survey in which the user is asked to provide the survey question and answer choices, as well as target respondent demographic information to whom the survey applies. The new survey question(s) with corresponding answer choices is then saved in the survey database so that subsequent users can find, view, respond, and modify the survey as described hereinabove.

In one example, the system uses question generating software which enables users to provide a statement or statements expressing an opinion about anything, and which generates a question (or questions) inquiring about the substance of the statement that elicits a response or reaction from respondents. For example, the user may wish to express their opinion by stating:

"The potholes on I-75 are horrible!"

The question generating software would then provide questions with options for answers from which the user can select an answer, such as:

"Do you believe the potholes on I-75 are horrible? (yes/no)"

"Rate how bad you believe the potholes on I-75 are: 0 (horrible)-10 (excellent)"

The user can then select the question that, when asked to respondents, best captures the respondent's opinion relative to the user's opinion. Moreover, the user can create their own questions and answers using the provided questions and answers as templates or ideas.

Presently, there are several types of question generating software which use different methods to extract questions from data such as sentences, computer software code, numerical information, and the like. The question generating software analyzes the software code, numerical information, sentences, and the like by performing one or more of: semantic, syntactic, and template-based approaches. As the techniques and algorithms described herein are further developed, it should be understood that any type of question generating software may be capable of accomplishing the intent of providing the user with one or more options for questions extracted from an opinion statement.

To incentivize users to create new surveys, the system provides for incentives which include a point reward system in which users earn points or coupons redeemable for valuables such as cash, goods, services, or a chance to win such valuables, in proportion to the quantity of respondents who have responded to a given question created by the user. Likewise, the incentives may be structured in proportion to a quantity of respondents in a given amount of time (i.e. if a predetermined number of respondents have responded to a question created by the user within a predetermined quantity of time). Thus, users are encouraged to create questions which will strongly elicit responses from other users. Other metrics can be used for the incentive point rewards, such as how widespread or targeted the responding demographic may be, or if a quantity of respondents in a specific demographic attains statistical significance.

Similarly, to incentivize users to respond to existing surveys, the system provides for incentives including a point reward system in which users earn points and/or coupons that are redeemable for valuables such as cash, goods, services, or the like, or a chance to win such valuables, for each of certain predetermined surveys to which the user responds.

Survey authors, such as those conducting market research, who wish to incentivize a certain user demographic to respond to their survey questions may also offer coupons redeemable for valuables such as cash, goods, or services (or a chance to win such valuables) to responds to their surveys within the desired demographic group. The ability to target a particular demographic is of particular use to marketers who wish to obtain survey information from a specific demographic on a specific topic.

The description of the above-mentioned incentives for authoring and responding to surveys, including each survey question's respondent tallies, and each user's question response counts, are logged and stored in the survey database and made accessible for subsequent users.

Thus, in several aspects, the system and method described herein enables users in a specific demographic to search for coupons or other incentives of interest offered and available to the user's demographic for answering specific surveys. For example, if a survey author wishes to obtain responses from a specific demographic related to the users' experience with a certain good or service, the survey author may offer a coupon or reward points to users in the specific demographic who answer the author's survey questions. Such information is then logged into the survey database and users can search for coupons or other incentives available to the user's particular demographic.

The system manages the transfer of incentives from survey authors to respondents using one or more methods known in the art. The value of the incentive point rewards and coupons for providing answers may vary, depending on such factors as demand and availability of respondents from a given demographic.

In one embodiment, to facilitate the creation of surveys on topics of similar nature, such as products' or services' owner/user satisfaction (i.e. cars, hotels, restaurants, etc.), the system provides templates for survey question and answer options that users can use to construct surveys. For example, if a user wishes to learn if owners of a particular pickup truck are satisfied with the vehicle, the user would use a survey template provided by the system and designed for automobiles, and which asks the owner satisfaction question, as well as other automobile-relevant questions. For example, other questions that may be included in the template might be: "How long have you owned this vehicle?", "Have you had this vehicle serviced for brakes?", etc. In this manner, surveys for multiple automobiles using the same template may be linked and cross-referenced such that comparisons between automobiles may be made. For example, the question: "How satisfied are you with your vehicle?" can be searched for all vehicles of a certain class to compare owner satisfaction between multiple vehicles from multiple manufacturers. Respondents would still have options to create, modify, and add follow-up questions and answers to the template survey questions to enable real-time updating and keeping surveys and survey questions relevant.

In some examples, the template survey questions and answer choices for specific survey topics are provided by the system and/or by user panels established by the system based on user expertise in the subject matter of the survey. Surveys may be conducted among potential user panel members and results may be used to arrive at a consensus for survey question and answer choices in a particular template.

In some embodiments, survey results from follow-up questions provided by other users and/or questions that have been modified by users other than the original or initial author of the survey may also be displayed. The modified survey questions can be displayed as links to the original survey question so that the user can view how the question evolved. Such links can be displayed, for example, in a parent-child tree configuration.

If the user requests to view surveys in order of number of respondents, and a modified question has more responses than the original question in the survey, then the modified questions may be automatically displayed first. This way, as the questions in the survey evolve, the most relevant questions and results are dynamically and automatically provided first. That is, the frequency at which a survey question or answer choice is used determines whether the survey question or answer choice is used, and more specifically, where in a list of surveys in order of number of respondents the survey question or answer choice appears. The more frequently the survey question or answer choice is used, the closer to the top of the results the question or answer choice will appear.

Figure 5:
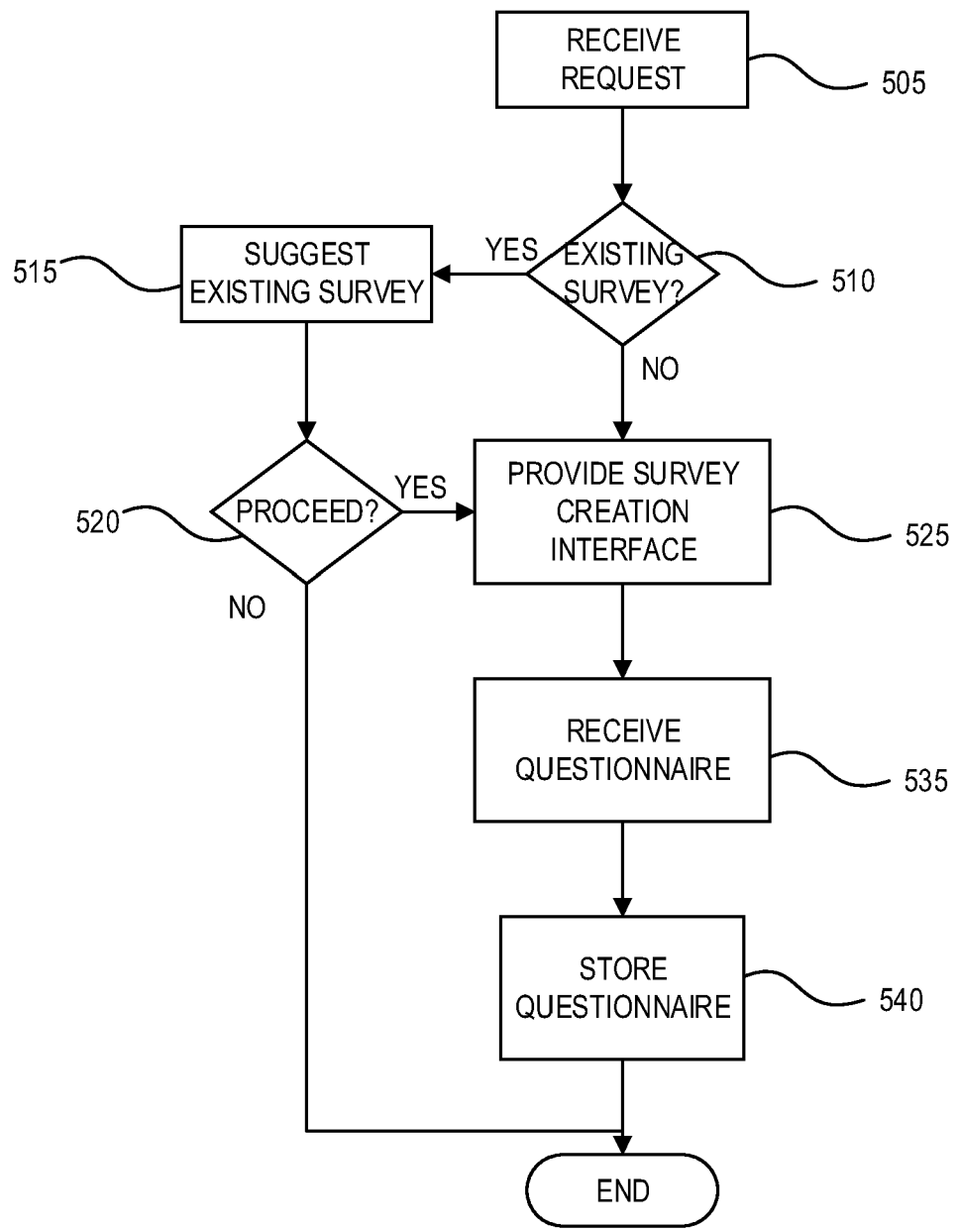
FIG. 5 depicts a flow diagram of a method of creating a new survey according to one or more embodiments shown and described herein.

FIG. 5 depicts a flow diagram of a method for creating a new survey according to an embodiment. Certain logic may be used to carry out the processes as described with respect to FIG. 5, such as, for example, the survey presentation logic 254 and/or the survey modification logic 256 (FIG. 2).

At step 505, a request to create a new survey may be received. The received request may include details regarding a survey (e.g., various terms that describe the survey, a particular topic, and/or the like). To ensure duplicate surveys are not created, a determination may be made at step 510 as to whether one or more existing surveys correspond to the received request. Such a determination may be completed, for example, by conducting a search according to the processes described herein with respect to FIG. 4. If no surveys are found, the process may proceed to step 525. If one or more surveys are found, those surveys may be suggested to the user in lieu of creating a new survey at step 515. A determination may be made at step 520 as to whether the user wishes to proceed with a survey creation or if the user wishes to abandon the request to create a new survey. If the user wishes to abandon the request, the process may end. Otherwise, the process proceeds to step 525.

If the survey creation process proceeds, the user may be provided with one or more tools to create a new survey in which the user will be asked to provide the structured survey questions and choices for answers, as well as the target demographic to whom the survey applies. A survey creating "wizard" or other software may be utilized to help the user design the structured survey questions and choices for answers. As a result of the user's survey creation, the completed survey (e.g., the questionnaire) may be received at step 535.

The new survey questionnaire may be stored in a database as survey data at step 540. As such, other users may be able to find, view, respond, and modify the survey as described herein.

In some embodiments, users may be required to register (or subscribe) in order to create, modify, and respond to surveys, and to have access to previously collected survey results. Registration may require attempting verification that the prospective user is a real person and resides at a physical address, in effect partially verifying users' demographic information. This may be accomplished by the website by mailing a verification card (mailer) to a prospective user at a physical address, where the mailer includes a unique verification code to be entered by the prospective user to complete the verification process. Usage may be restricted if the user has not been verified.

Registration may also enable record keeping of the surveys that have been created, modified, responded, and viewed by each registered user, as well as the history of responses to each survey. Thus, once registered, users can update their previous survey answers or provide new survey information as their opinions evolve. The user registration information can be stored in a user registration database which can be part of the survey database or a separate database for security reasons.

Users may be required to respond to a survey questionnaire in order to have access to previously collected survey results. The survey questionnaire that the user responds to relates to any subject, including, but not limited to, products or services (e.g., rate a car or hotel), preferences (e.g., for a presidential candidate), opinions (e.g., should abortion be legal?), behavior (smoking and alcohol use), or factual information (e.g., income).

Thus, in the present disclosure, one incentive for a potential respondent to answer a survey questionnaire on subject is to access previously collected survey results on a different subject. Generally, it is expected that the specific subject of the survey results sought by a person will be different from the specific subject of the survey that person responds on the website.

In another embodiment, the features of the present systems and methods are provided by embedding a program, such as an add-on, application programming interface (API), extension, and/or plugin or script running in a website browser, thus enabling users to provide and obtain survey feedback on the content and usability of web sites, mobile apps, and the like while browsing those same websites, mobile apps, and the like. For example, when a user accesses a website using a browser, the program, add-on, extension, plugin, an application programming interface, a script or the like enables the user to create, respond to, and view results of surveys about the accuracy of information provided on the web site. Similarly, usability characteristics, such as user friendliness, how easy it is to find information on the site, searchability scores, veracity of content, and so forth may be surveyed. Thus, website survey questions and answers are logged into the survey database and are available to system users as described hereinabove. Indeed, users may determine while, or in advance of, browsing a website, which websites are highly rated or viewed by other users as helpful, deceptive, truthful, well or poorly fact-checked, or the like.

Similarly, the features of the present systems and methods may be executed from a program or sub-program embedded in an operating system of any computer, such as a mobile device, laptop, desktop, or the like. In another example, the features of the present systems and methods may be executed in an application or app running on the computer, thus enabling users to provide and obtain survey feedback on the content and usability of other applications, apps, programs, and the like which are installed and/or running on the computer.

It should now be understood that the systems and methods described herein can be used to provide a dynamic survey to users, where the dynamic surveys can be updated by the users to accurately reflect a particular user's opinions. More specifically, a survey can be modified by a user such that a question and/or an associated response accurately reflects the user's opinion. Such a dynamic survey may be searchable in a database of survey responses in real time, which allows for up-to-date data regarding particular opinions. In addition, the systems and methods described herein may provide functionality for searching for surveys and creation of new surveys.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

A system and method for providing incentive based dynamic survey information of the present disclosure offers several advantages. These include the ability to provide incentive based dynamic survey information which is modifiable by one or more respondents such that the response data accurately reflects the one or more respondents' opinions. More specifically, the system and method described herein provides a fundamental technical improvement to techniques for conducting, and thereby to the accuracy of electronic surveys by providing systems and methods which enable users to seamlessly modify survey questions and answers on a graphical user interface. Furthermore, the system and method automatically provide the options to answer the survey questions, modify survey questions, and to modify survey answers based on the accuracy of the user's answers. The modified questions and answers are automatically provided to subsequent users. Furthermore, the system and method described herein provide modified questions and answers to subsequent users in the order of the number or quantity of entries logged into a survey database for a user response to each modified question and answer option. Additionally, the technology described herein provides automatic question generating software that enables a user to automatically enter a user-selected question from a user generated statement. Thus, the systems and methods described herein provide for a user to seamlessly and dynamically modify a question and/or one or more of the preset responses to a question so that the user's response more accurately reflects the user's opinion.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of dynamically creating and modifying an electronic survey via a graphical user interface on a website, the method comprising:
    providing a website with hardware and software server components, the components including non-standard or specialized components that perform services for website users and respondents, the specialized components including one or more databases each in electronic communication with a non-transitory, processor-readable storage medium, the non-transitory, processor-readable storage medium storing one or more surveys and previously collected survey results relating to particular subject matter;
    establishing communication via the internet between a processing device and the one or more databases;
    accessing, via the processing device, one or more surveys stored in the one or more databases, each of the one or more surveys having first survey questions each of the first survey questions having selectable first answer options;
    receiving, via the graphical user interface on the website, a respondent input requesting a first survey within the database, wherein the graphical user interface includes input/output hardware in electronic communication with the processing device;
    searching a database for survey questions matching the search criteria from the respondent input;
    providing first survey questions via the graphical user interface on the website, including a modification of at least one of the first survey questions, wherein the modification corresponds to a revised question that more accurately reflects an opinion of a respondent than the first survey questions;
    presenting, via the graphical user interface, a survey matching the respondent input including the first survey questions, each of the selectable first survey questions having selectable first answer options including a question modification option, an answer provision option and an answer modification option;
    prompting respondents to input a statement about particular subject matter;
    analyzing the statement with survey question generating software, the statement being submitted via the graphical user interface, the survey question generating software stored as programmatic control logic in the storage medium in electronic communication with at least one of the one or more databases and the processing device; the statements comprising one or more of sentences, numerical information, and computer software code;
    utilizing the survey question generating software to extract one or more new questions from the statement by performing one or more of: syntactic analysis, semantic analysis, and template-based analysis; and
    providing to respondents, one or more new questions as first survey questions;
    receiving, via the graphical user interface, a respondent response to the first survey questions, wherein the respondent response includes one or more of: selecting the question modification option and providing a new or modified question, selecting the answer provision option and providing a selected answer, and selecting the answer modification option and providing a modified answer;
    uploading the respondent response to the first survey questions to the database via the processing device and through the internet; and
    dynamically modifying, by the processing device, the first survey by automatically appending the respondent response to the first survey questions in real time, wherein the dynamically modified first survey is provided to subsequent users and respondents, and wherein users are able to provide and obtain survey feedback on the content and usability of websites and mobile applications, while browsing the same websites and mobile applications.

2. The method of claim 1 wherein receiving, via the graphical user interface, a respondent response further includes:
    receiving, by the processing device, an input corresponding to a new question and one or more corresponding new answer choices for the new question;
    receiving, by the processing device, a respondent selection of one or more of the new answer choices; and
    selectively appending the respondent response to the first survey.

3. The method of claim 2 wherein selectively appending the respondent response to the first survey further includes:
    receiving a modification of one or more of the selectable first answer options, including:
    receiving an answer that more accurately reflects an opinion of the respondent than the selectable first answer options.

4. The method of claim 3 wherein selectively appending the respondent response to the first survey further includes:
    searching the database for previous responses to the question modification option, the answer provision option, and the answer modification option;
    when the respondent response matches an existing response from the previous responses to the question modification option, the answer provision option and the answer modification option, logging by the processing device, the respondent response in the database as an additional one of the existing responses to the question modification option, the answer provision option and the answer modification option; and
    when the respondent response does not match an existing response from the previous responses to the question modification option the answer provision option and the answer modification option, logging, by the processing device, the respondent response in the database as a second new response.

5. The method of claim 4 wherein dynamically modifying the first survey further includes:
    statistically aggregating, by the processing device, the respondent responses to produce updated survey results in a batch process;
    updating the first survey with the additional one of the existing responses and second new responses;
    statistically aggregating the respondent responses to produce updated survey results in real time;
    receiving, by the processing device, a request for updated survey results;

providing, via the graphical user interface on the website, updated survey results to website users and respondents; and providing the updated survey results by presenting updated first survey questions from user and respondent selected surveys in the order of one or more of: a quantity of existing responses to the first survey questions, a quantity of second new responses to the first survey questions, a quantity of responses to the answer provision option with matching answer selections.

6. The method of claim 1 further comprising:

utilizing an incentive system stored as programmatic control logic in the storage medium in electronic communication with at least one of the one or more databases and the processing device, the incentive system incentivizing users to author new survey questions and provide survey answers, wherein:

users accumulate credits within the incentive system that are redeemable for value in the form of one or more of: cash, goods, and services, or a chance to win one or more of cash, goods, and services; the credits accumulating in proportion to a quantity of respondents who have responded to a question generated by an authoring user;

respondents accumulate credits within the incentive system for each of certain predetermined surveys or survey questions to which the respondent responds.

7. The method of claim 1 further comprising:

utilizing an embedded program to access the one or more databases; receive the respondent input; present via the graphical user interface, the survey matching the respondent input, and receive via the graphical user interface, the respondent response to the first survey questions, wherein the embedded program comprises one or more of: an add-on, an extension, a website browser extension, an application programming interface; a script or a plugin in a website browser; and dynamically modifying, by the processing device, the first survey by automatically appending the respondent response to the first survey questions via the embedded program; and wherein the dynamically modified first survey, including website information extracted from the dynamically modified first survey including: website usability, website user friendliness, website searchability, and website veracity is provided to subsequent users and respondents.

8. The method of claim 1 wherein receiving, via the graphical user interface, a respondent response to the first survey questions further includes:

receiving one or more text inputs that supplement or replace an existing text of at least one of the first survey questions and the selectable first answer options.

9. The method of claim 1 further comprising:

accessing a survey creation tool on the website to create a survey;

receiving survey characteristics including structured survey questions, answer choices, and target demographic information from a survey creator user accessing the survey creation tool;

searching the database for questions and answer information from prior surveys matching the survey characteristics;

extracting questions and answer information from prior surveys that match the survey characteristics; and offering to the survey creator user the questions and answer information from prior surveys having similarly structured survey questions, answer choices, and demographic information.

10. A system for providing a dynamic survey via a graphical user interface on a website, the system comprising:

a website with hardware and software server components, the components including non-standard or specialized components that perform services for website users and respondents, the specialized components including one or more databases storing previously collected surveys;

the one or more databases each in electronic communication with a non-transitory, processor-readable storage medium, the non-transitory processor-readable storage medium comprising one or more programming instructions that, when executed, cause a processing device of the hardware and server components to:

establish communication via the internet between a processing device and the one or more databases;

access the one or more databases, each of the one or more databases having a storage medium storing one or more surveys, each of the one or more surveys having first survey questions;

receive, via the graphical user interface on the website, a respondent input requesting a first survey within the database, wherein the graphical user interface includes input/output hardware in electronic communication with the processing device;

search a database for survey questions matching search criteria from the respondent input;

provide first survey questions via the graphical user interface on the website, including a modification of at least one of the first survey questions, wherein the modification corresponds to a revised question that more accurately reflects an opinion of a respondent than the first survey questions;

present, via the graphical user interface, a respondent selected survey including the first survey questions, each of the survey questions having selectable first answer options including a question modification option, an answer provision option, and an answer modification option;

receive, via the graphical user interface, a respondent response to the first survey questions, wherein the respondent response includes one or more of:

selecting the question modification option and providing a modified or new question;

selecting the answer provision option; and providing an answer to the one or more of the first survey questions;

selecting the answer modification option and providing a modified answer to the first survey questions;

search the database for previous responses to the question modification option, the answer provision option, and the answer modification option;

when the respondent response matches an existing response from the previous responses to the question modification option, the answer provision option, and the answer modification option, log by the processing device, the respondent response in the database as an additional one of the existing responses;

when the respondent response does not match an existing response from the previous responses to the question modification option, the answer provision option, and the answer modification option, log, by the processing device, the respondent response in the database as a second new response;

statistically aggregate the one or more respondent responses to produce updated survey results in real time, or by a batch process;

update the first survey with the additional one of the existing responses and second new responses;

receive a request for updated survey results;

provide, via the graphical user interface on the website, updated survey results to website users and respondents;

provide the updated survey results by presenting updated first survey questions from user and respondent selected surveys in the order of one or more of: a quantity of existing responses to the first survey questions, a quantity of second new responses to the first survey questions, and a quantity of responses to the answer provision option having matching answer selections;

upload the respondent response to the first survey questions from the graphical user interface to the database via the processing device and through the internet;

utilizing an incentive system stored as programmatic control logic in the storage medium in electronic communication with at least one of the one or more databases and the processing device, the incentive system incentivizing users to author new survey questions and provide survey answers, wherein:

users accumulate credits within the incentive system that are redeemable for value in the form of one or more of: cash, goods, and services, or a chance to win one or more of cash, goods, and services; the credits accumulating in proportion to a quantity of respondents who have responded to a question generated by an authoring user;

respondents accumulate credits within the incentive system for each of certain predetermined surveys or survey questions to which the respondent responds;

prompt respondents to input a statement about particular subject matter;

analyze the statement with survey question generating software, the statement being submitted via the graphical user interface, the survey question generating software stored as programmatic control logic in the storage medium in electronic communication with at least one of the one or more databases and the processing device; the statements comprising one or more of sentences, numerical information, and computer software code;

utilize the survey question generating software to extract one or more new questions from the statement by performing one or more of: syntactic analysis, semantic analysis, and template-based analysis;

providing to respondents, the one or more new questions as first survey questions; and dynamically modifying, by the processing device, the first survey based on the respondent response to the first survey questions by automatically appending the respondent response to the first survey questions, wherein the dynamically modified first survey is provided to subsequent users and respondents, and wherein users are able to provide and obtain survey feedback on the content and usability of websites and mobile applications, while browsing the same websites and mobile applications; and a display that displays the graphical user interface with the first survey questions to the respondent.

11. The system of claim 10 wherein the non-transitory processor-readable storage medium further includes one or more programming instructions that, when executed, cause the processing device to:

receive, by the processing device, an input corresponding to a new question and one or more corresponding new answer choices for the new question;

receive, by the processing device, a respondent selection of one or more of the new answer choices; and selectively append the respondent response to the first survey by:

receiving a modification of one or more of the selectable first answer options, including:

receiving an answer that more accurately reflects an opinion of the respondent than the selectable first answer options.

12. The system of claim 10 wherein the non-transitory processor-readable storage medium further includes one or more programming instructions that, when executed, cause the processing device to:

utilize an embedded program to access the one or more databases; receive the respondent input; present via the graphical user interface, the survey matching the respondent input, and receive via the graphical user interface, the respondent response to the first survey questions, wherein the embedded program comprises one or more of: an add-on, an extension, a website browser extension, an application programming interface, a script or a plugin in a website browser; and dynamically modify the first survey by automatically appending the respondent response to the first survey questions via the embedded program; and wherein the dynamically modified first survey, including website information extracted from the dynamically modified first survey including: website usability, website user friendliness, website searchability, and website veracity is provided to subsequent users and respondents.

13. The system of claim 10 wherein the non-transitory processor-readable storage medium further includes one or more programming instructions that, when executed, cause the processing device to:

provide a survey creation tool on the website to create a survey;

receive survey characteristics including structured survey questions, answer choices, and target demographic information from a survey creator user accessing the survey creation tool;

search the database for questions and answer information from prior surveys matching the survey characteristics;

extract questions and answer information from prior surveys that match the survey characteristics; and offer to the survey creator user the questions and answer information from prior surveys having similarly structured survey questions, answer choices, and demographic information.

14. A computing system that provides a dynamic survey via a graphical user interface on a website, the computing system comprising:

a website with hardware and software server components, the components including non-standard or specialized components that perform services for website users and respondents, the specialized components including one or more databases each in electronic communication with a non-transitory, processor-readable storage medium, the non-transitory, processor-readable storage medium storing one or more surveys and previously collected survey results relating to particular subject matter;

input/output hardware in electronic communication with a processing device, the input/output hardware:

receiving respondent input including search criteria from a respondent requesting a survey;

searching a database for survey questions matching the search criteria from the respondent input;

providing first survey questions via the graphical user interface on the website, including a modification of at least one of the first survey questions, wherein the modification corresponds to a revised question that more accurately reflects an opinion of a respondent than the first survey questions, wherein the non-transitory processor-readable storage medium stores one or more programming instructions that, when executed, cause the processing device to:

establish communication via the internet between a processing device and the one or more databases;

access, via the processing device, one or more surveys stored in the one or more databases, each of the one or more surveys having first survey questions;

receive, via the graphical user interface on the website, a respondent input selecting a first survey within the database;

receive, by the graphical user interface on the website, a respondent input corresponding to a new question and one or more corresponding new answer choices for the new question;

search the database for previous responses to the question modification option and the answer modification option, and when the respondent response matches an existing response from the previous responses to the question modification option and the answer modification option, logs, by the database, the respondent response in the database as an additional one of the existing responses, and when the respondent response does not match an existing responses from the previous responses to the question modification option and the answer modification option, logs, by the processing device, the respondent response in the database as a second new response;

receive, by the processing device, a respondent selection of the one or more new answers; and provide, by the processing device, the new question and the corresponding new answer or answers to one or more users for approval;

present, via the graphical user interface, a user selected survey including the first survey questions, each of the survey questions having selectable first answer options including a question modification option and an answer modification option;

receive, via the graphical user interface, a respondent response to the first survey questions, wherein the respondent response includes one or more of:

selecting the question modification option and the selecting the answer modification option;

uploads the respondent response to the first survey questions to the database via the processing device and through the internet;

dynamically modifies the first survey based on the respondent response to the first survey questions by automatically appending the respondent responses to the first survey questions by:

statistically aggregating the one or more respondent responses to produce updated survey results in real time, or by a batch process;

presenting the updated survey results in the order of one or more of: a quantity of existing responses to the first survey questions, a quantity of second new responses to the first survey questions, a quantity of responses to the answer provision option to be defined with matching answer selections; and utilize an incentive system stored as programmatic control logic in the non-transitory processor-readable storage medium in electronic communication with at least one of the one or more databases and the processing device, the incentive system incentivizing respondents to author new survey questions and provide survey answers, wherein:

respondents accumulate credits within the incentive system that are redeemable for value in the form of one or more of: cash, goods, and services, or a chance to win one or more of cash, goods, and services; the credits accumulating in proportion to a quantity of respondents who have responded to a question generated by an authoring respondent, and wherein respondents accumulate credits within the incentive system for each of certain predetermined surveys or survey questions to which the respondent responds;

prompt respondents to input a statement about particular subject matter;

analyze the statement with survey question generating software, the statement being submitted via the graphical user interface, the survey question generating software stored as programmatic control logic in the storage medium in electronic communication with at least one of the one or more databases and the processing device; the statements comprising one or more of sentences, numerical information, and computer software code;

utilize the survey question generating software to extract one or more new questions from the statement by performing one or more of: syntactic analysis, semantic analysis, and template-based analysis; and providing to respondents, the one or more new questions as first survey questions; and a display that displays the graphical user interface with the first survey questions to the respondent.

15. The computing system of claim 14 wherein the processing logic further:

selectively appends the respondent response to the first survey by:

receiving a modification of the selectable first answer options, including:

receiving an answer that more accurately reflects an opinion of the respondent than the selectable first answer options.

16. The computing system of claim 14 wherein the processing logic further:

accesses a survey creation tool on the website to create a survey;

receives survey characteristics including structured survey questions, answer choices, and target demographic information from a survey creator user accessing the survey creation tool;

searches the database for questions and answer information from prior surveys matching the survey characteristics;

extracts questions and answer information from prior surveys that match the survey characteristics;

offers to the survey creator user the questions and answer information from prior surveys having similarly structured survey questions, answer choices, and demographic information; and utilizes an embedded program to access the one or more databases; receive the respondent input; present via the graphical user interface, the survey matching the respondent input, and receive via the graphical user interface, the respondent response to the first survey questions, wherein the embedded program comprises one or more of: an add-on, an extension, a website browser extension, an application programming interface, a script or a plugin in a website browser; and dynamically modifies the first survey by automatically appending the respondent response to the first survey questions via the embedded program; and wherein the dynamically modified first survey, including website information extracted from the dynamically modified first survey including: website usability, website user friendliness, website searchability, and website veracity is provided to subsequent users and respondents.

\* \* \* \* \*